G. A. LYON.
DUPLEX BUFFER.
APPLICATION FILED MAR. 10, 1920. RENEWED JAN. 11, 1922.
1,410,937.
Patented Mar. 28, 1922.
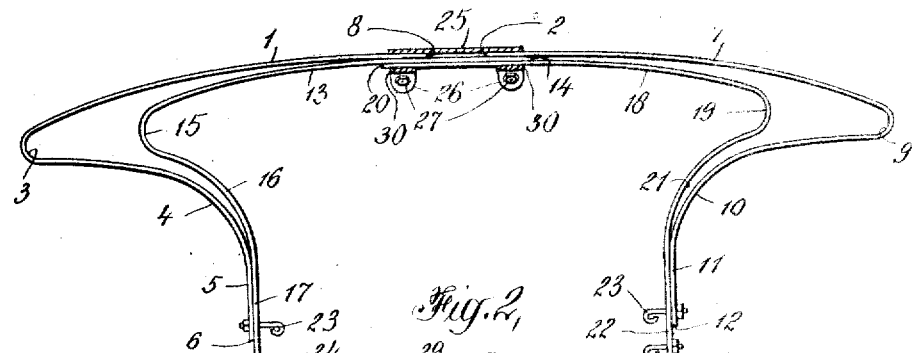
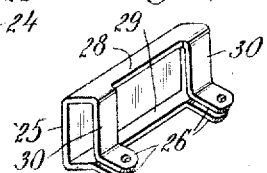
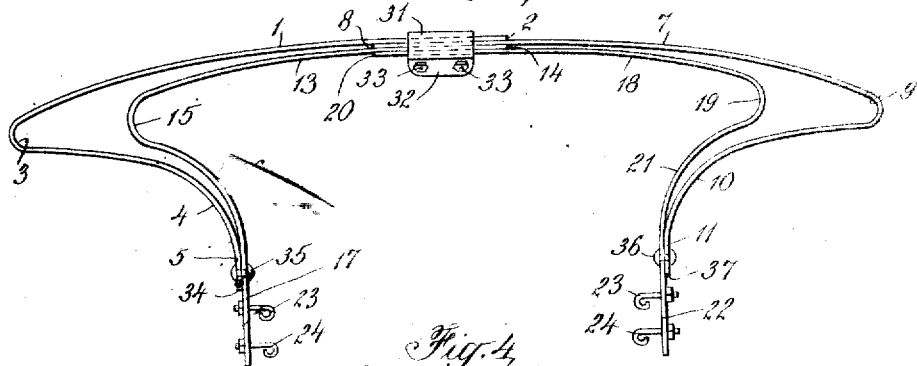
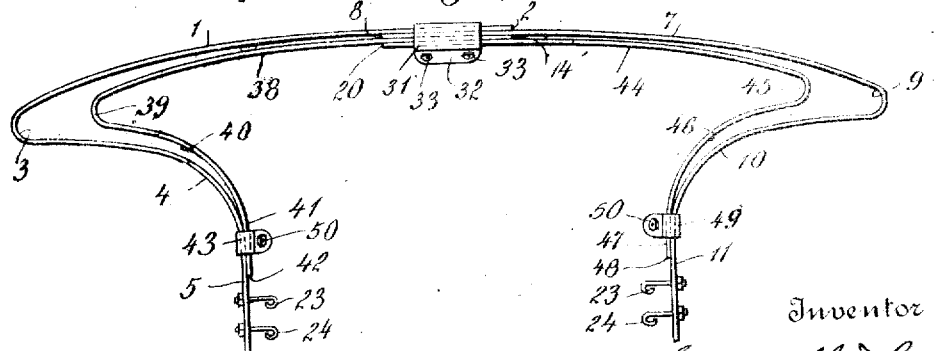
Inventor
George Albert Lyon
By his Attorney

UNITED STATES PATENT OFFICE.

GEORGE ALBERT LYON, OF PHILADELPHIA, PENNSYLVANIA.

DUPLEX BUFFER.

1,410,937.
Specification of Letters Patent.
Patented Mar. 28, 1922.

Application filed March 10, 1920, Serial No. 364,623. Renewed January 11, 1922. Serial No. 528,558.

*To all whom it may concern:*

Be it known that I, GEORGE ALBERT LYON, a citizen of the United States, and resident of Philadelphia, county of Philadelphia, and State of Pennsylvania, have made certain new and useful Inventions Relating to Duplex Buffers, of which the following is a specification, taken in connection with the accompanying drawing.

This invention relates especially to duplex buffers or bumpers for automobiles or other vehicles in which the outer buffer element, which may be advantageously formed of one or more pieces or strips of spring steel, may have attaching members and end loops projecting outwardly therefrom so as to be adapted to extend into protective position adjacent the vehicle wheels. The inner buffer element which may be formed of one or more pieces of generally similar spring steel or other resilient strip may comprise closely spaced connector ends or portions adjustably or permanently connected to the corresponding portions of the other buffer element adjacent the supporting ends of the attaching members and the central parts of the buffer front or impact receiving members while the end loops of the inner buffer element preferably extend outward from the attaching members thereof between about one-quarter to three-fourths as much as the end loops of the outer buffer element. In some cases the attaching members may be connected together before the supporting end thereof is reached which is connected to the automobile frame member, although, if desired, both attaching members may be connected to or penetrated by one or more of the hook bolt attachers, which may advantageously be used to connect the buffer to the vehicle frame members. The central connector portions of the buffer strips or elements may be arranged with aligned connector ends or these connector ends may overlap each other in some or all cases, which gives a still greater range of lateral adjustment of the buffer where this is desired, and these parts may of course be more or less enclosed or otherwise connected by any suitable clamping devices, bolts or clips. By having the ends of the connector portions of the buffer elements closely spaced, while the intermediate or end loop portions of these buffer elements are spaced apart, a greater freedom of movement and resilient yielding action is secured under collision conditions which is considerably promoted by extending the inner end loops out to at least a considerable extent beyond the attaching members. If desired, however, the inner buffer element may have impact receiving portions in close or substantial contact with the adjacent portions of the outer buffer element especially where the rear portions of these inner end loops are amply spaced away from the cooperating parts of the outer elements behind to give such resilient yielding action.

In the accompanying drawing showing in a somewhat diagrammatic way illustrative embodiments of this invention, Fig. 1 is a plan view partly in section of one arrangement.

Fig. 2 is a perspective view of the connecting device which may be used therewith; and Figs. 3 and 4 are plan views showing other illustrative buffers.

The outer element of the duplex buffer shown in Fig. 1 may be formed of one or more strips of tempered spring steel or other suitable resilient material preferably arranged with the width of the strip substantially vertical so as to give greater vertical rigidity to the buffer as it is mounted on a vehicle. As indicated this outer buffer element, may comprise the front or impact receiving members 1, 7 formed of separate resilient strips where lateral adjustment is desired, and these strips may be bent to form outwardly projecting end loops 3, 9 between these impact receiving members and the connected attaching members 5, 11, the gradually curving resilient bends 4, 10 being used, if desired, to give greater resilience at these points. The inner buffer element formed, if desired, of generally similar spring steel strip two inches or so wide and one-quarter to three-eighths inches or so thick may advantageously have the inner impact receiving members 13, 18 and the attaching members 17, 22 between which are arranged the outwardly extending end loop portions 15, 19 and the connecting curved portions 16, 21, these end loops of the inner element advantageously extending outward about half as far as the end loops of the outer buffer element.

All of the impact receiving members or connected portions of the buffer elements may be adjustably or permanently connected in any suitable way and as indicated in Fig. 1 the duplex clamping device or enclosing clip 25 may be used for this purpose and may be tightened around the connector portions as by the tightening bolts or nuts 27, passing through suitable apertures in the ends of this clamping device which may extend downwardly and rearwardly, if desired, as is indicated in Fig. 2. This clamping device, which may advantageously be formed or bent up out of sheet steel or the like may have the integral aligning flanges 28, 29 cooperating quite closely with the upper and lower edges of these connector members which may, in some cases, at least, have aligned ends such as 2, 8 which may be arranged in line with each other in contact with the front of this clamping device, while some of the inner connector portions or ends such as 14, 20 may overlap throughout more or less of this connector portion of the buffer to give still greater strength thereto. The attaching members may, advantageously, in some cases, have different length supporting ends such as 12, 22, and it is sometimes desirable, though not of course necessary, to have the inner buffer element extend back further toward the supporting end of the buffer, which is clamped or connected to the automobile frame or other parts of the vehicle as by the hook bolt attachers 23, 24, which may, if desired, pass through suitable holes or slots in these attaching members. By having the forward attachers 23, on each side of the buffer, pass through a fairly tight fitting hole in both the inner and outer attaching members these parts may be simultaneously connected at this point and secured to the automobile frame member, which is an efficient and desirable arrangement, while, if desired, the rear attacher such as 24, may pass through an adjusting slot in the inner attaching member 22, which eliminates practically all difficulty about getting both sets of apertures accurately in line. Under service conditions the buffer is thus securely mounted on the automobile frame to project therefrom either in front of or back of the vehicle and the inner and outer elements of the duplex buffer are connected together at or adjacent their attaching members or portions and at about the middle of the buffer front while the intermediate or end loop portions are, as indicated, preferably somewhat spaced apart at least from one of the cooperating buffer strips outside them which minimizes rattling or vibration noise and also gives a greater extent of resilient yeilding action under collision conditions. For this reason the impact receiving portions of the inner buffer element may gradually diverge from the adjacent parts of the outer buffer elements, although this is not of course necessary in all cases, since a closer or contacting spacing of these parts may be employed in some instances, especially where there is ample spacing between the rearward portions of these cooperating buffer elements.

Fig. 3 shows another arrangement in which the attaching members of the inner and outer buffer elements may be detachably or permanently connected together in front of the supporting ends through which the hook bolt or other attachers 23, 24 may project. As indicated the attaching members 5, 11 of the outer buffer element may have their ends 34, 37 terminate somewhat in front of the supporting ends 17, 22 of the inner attaching members and one or more connecting bolts or rivets such as 35, 36 may be used to connect these elements on each side of the buffer. The strips or members forming the cooperating inner and outer elements may, in this case, be of generally similar construction to the Fig. 1 arrangement except that as illustrated in Fig. 3 the outer buffer element may have overlapping front connector portions in which the ends 2, 8 may overlap to a substantially similar extent at the ends 14, 20 of the inner buffer element, all of these overlapping strip ends or connector portions being adjustably and securely connected as by one or more enclosing clamping devices such as 31, having one or more bolts or nuts 33 to force together its ends or diagonally arranged edges 32. In this way also the loop ends 15, 19 of the inner buffer element may project outward considerably beyond the connected attaching members 17, 22, this outward projection of the inner loop ends being in this instance about half as great as in the case of the outer loop ends 3, 9 which may extend outward into protective position in connection with the vehicle wheels.

Fig. 4 shows another illustrative arrangement in which a similar overlapping front connector portion may be used, the loop ends 29, 45 of this inner buffer member being in this case however arranged to extend outward, even further beyond the connected attaching members 41, 47. These inner end loops may, as indicated, extend out as much as two thirds or three-fourths as far as the end loops 3, 9 of the outer buffer element, which is a desirable construction in many cases, since it gives a still greater resilient yield in this inner buffer element, so that a correspondingly improved cushioning action is secured under collision impact. The impact receiving members 38, 44 of this inner buffer element may, as indicated, be arranged quite close to the corresponding impact receiving members 1, 7 of the outer buffer element, although as indicated the intermediate or end loop portions are preferably more widely spaced apart than the front connector portions or the permanently or detachably connected attaching members or portions of these strips.

The attaching members 41, 47 of the inner buffer element which may comprise resilient curved portions 40, 46, if desired, may in some cases be detachably connected to the attaching members of the outer buffer element, as by the use of enclosing clamps or clips such as 43, 49 secured tightly around these strip ends when the bolts or nuts 50 are tightened. In this instance the inner attaching members are shorter than the outer ones and the ends 42, 48 of these inner attaching members, may in some instances, terminate before reaching the supporting ends 5, 11, which may be clamped or connected to the automobile frame as by the hook bolt attachers 23, 24 which may extend through holes or slotted apertures in these attaching members.

This invention has been described in connection with a number of embodiments, forms, proportions, parts, arrangements, materials, methods, of manufacture, connection and use, to the details of which disclosure the invention is not of course to be limited, since what is claimed as new and what is desired to be secured by Letters Patent is set forth in the appended claims:

1. The duplex automobile buffer comprising inner and outer buffer elements, each formed of a plurality of connected strips, said elements, comprising impact receiving members and attaching members and intermediate outwardly projecting end loops projecting outward beyond said attaching members, said elements being closely spaced adjacent said attaching members and the central connector portions of said impact receiving members, an adjustable duplex connecting device enclosing said central connector portions to securely hold them in laterally overlapping position, the end loops of said inner buffer elements extending outward beyond said attaching members at least about half as far as the end loops of said outer buffer element to secure increased resilient yielding action, and means to detachably connect the attaching members of said inner and outer buffer elements.

2. The duplex automobile buffer comprising inner and outer buffer elements, each formed of a plurality of connected strips, said elements comprising impact receiving members and attaching members and intermediate outwardly projecting end loops projecting outward beyond said attaching members, said elements being closely spaced adjacent said attaching members and the central connector portions of said impact receiving members, an adjustable connecting device cooperating with said central connector portions to securely hold them in laterally overlapping position and means to connect the attaching members of said inner and outer buffer elements.

3. The duplex automobile buffer comprising inner and outer buffer elements, each formed of a plurality of adjustably connected strips of flat spring steel, said elements comprising impact receiving members and attaching members and intermediate outwardly projecting end loops projecting outward beyond said attaching members, said elements being closely spaced adjacent the central connector portions of said impact receiving members, an adjustable connecting device engaging said central connector portions to securely hold them in laterally overlapping position, and means to connect the attaching members of said inner and outer buffer elements.

4. The duplex automobile buffer comprising inner and outer buffer elements, each formed of flat spring steel, said elements comprising impact receiving members and attaching members and intermediate outwardly projecting end loops projecting outward beyond said attaching members, said elements being closely spaced adjacent the central connector portions of said impact receiving members, and a connecting device engaging said central connector portions to securely hold them in position.

5. The duplex automobile buffer comprising inner and outer buffer elements formed of flat spring steel strip, said elements comprising impact receiving members and attaching members and intermediate outwardly projecting end loops projecting outward beyond said attaching members, said elements being closely spaced adjacent the central connector portions of said impact receiving members and being spaced apart on at least one side of said end loops, an adjustable connecting device cooperating with said central connector portions to securely hold them in laterally overlapping position, the end loops of said inner buffer element extending outward beyond said attaching members at least about a quarter as far as the end loops of said outer buffer elements to secure increased resilient yielding action.

6. The duplex automobile buffer comprising inner and outer buffer elements formed of flat steel strip, said elements comprising impact receiving members and attaching members and intermediate outwardly projecting end loops projecting outward beyond said attaching members, said elements comprising impact receiving members and attaching members and intermediate outwardly projecting end loops projecting outward beyond said attaching members, said elements being closely spaced adjacent the central connector portions of said impact receiving members and being spaced apart on at least one side of said end loops and a connecting device cooperating with said central connector portions to securely hold them in position.

7. The duplex spring strip buffer for automobiles or other vehicles, comprising cooperating inner and outer spring strip buffer elements having closely spaced connector portions adjacent the central part of the front impact receiving members of said elements and adjacent the attaching members thereof which are adapted to be connected to the automobile or other vehicle, said buffer elements comprising end loops extending outward beyond said attaching members, the end loops of said inner buffer element extending outward at least about half as far beyond said attaching members and the outer end loops.

8. The duplex spring strip buffer for automobiles or other vehicles, comprising cooperating inner and outer spring strip buffer elements having closely spaced cooperating portions adjacent the central part of the front impact receiving members of said elements and adjacent the attaching members thereof which are adapted to be connected to the automobile or other vehicle, said buffer elements comprising inner and outer end loops extending outward beyond said attaching members.

9. The duplex buffer for automobiles or other vehicles, comprising cooperating inner and outer resilient strip buffer elements having closely spaced central connector portions adjustably connected adjacent the central part of the front impact receiving members of said elements and adjacent the attaching members thereof adapted to be connected to the vehicle, said buffer elements comprising end loops extending outward beyond said attaching members, the end loops of said inner buffer element extending outward at least about half as far beyond said attaching members as the outer end loops.

10. The duplex buffer for automobiles or other vehicles, comprising cooperating inner and outer strip buffer elements having closely spaced central connector portions adjustably connected adjacent the central part of the front impact receiving members of said elements, said buffer elements comprising end loops extending outward beyond said attaching members, the end loops of said inner buffer element extending outward at least about half as far beyond said attaching members as the outer end loops.

11. The duplex buffer for automobiles or other vehicles, comprising cooperating inner and outer strip buffer elements having relatively closely spaced central portions adjacent the central part of the front impact receiving members of said elements, said buffer elements both comprising outwardly extending end loops normally out of contact with each other.

12. The duplex resilient buffer for automobiles or other vehicles, comprising cooperating inner and outer buffer elements having attaching members and closely spaced central portions adjacent the central part of the impact receiving members of said elements, said buffer elements both comprising end loops extending outward beyond said attaching members, the end loops of said inner buffer element extending outward at least about a quarter as far beyond said attaching members as the outer end loops.

13. The duplex resilient buffer for automobiles or other vehicles, comprising cooperating inner and outer buffer elements having closely spaced portions adjacent the impact receiving members of said elements, said buffer elements both comprising outwardly extending end loops.

GEORGE ALBERT LYON.